J. W. FIELD.
WASH-BOILER.
No. 182,654. Patented Sept. 26, 1876.
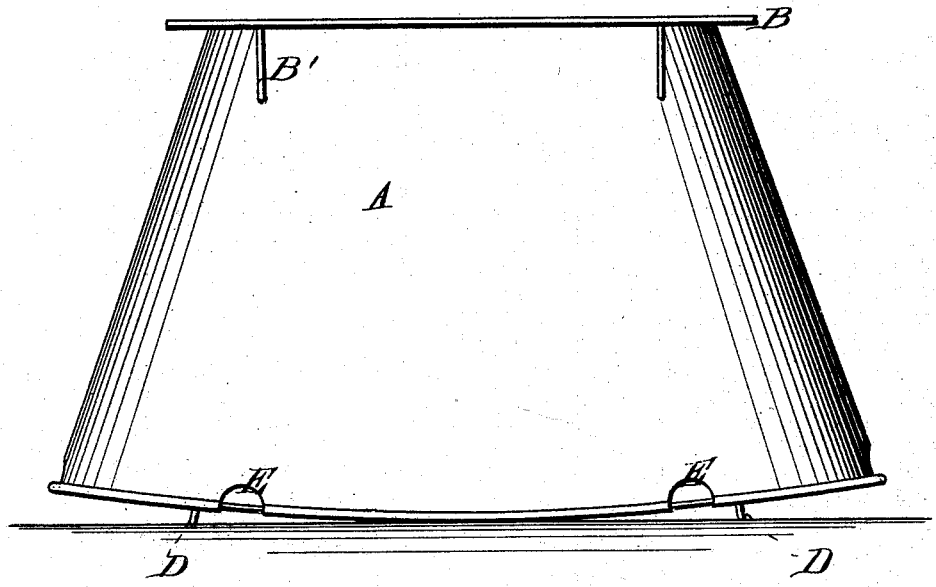
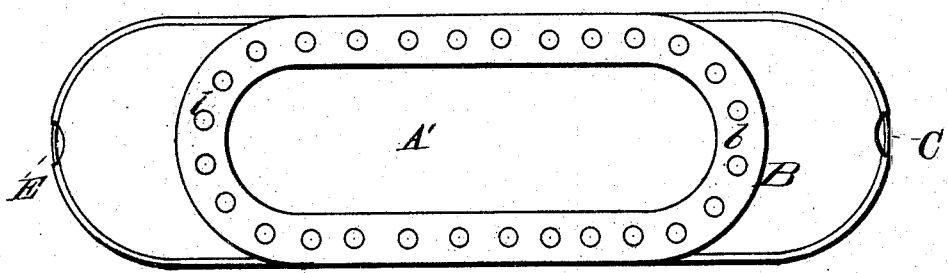

UNITED STATES PATENT OFFICE.

JOSIAH W. FIELD, OF ROCKFORD, ILLINOIS.

IMPROVEMENT IN WASH-BOILERS.

Specification forming part of Letters Patent No. 182,654, dated September 26, 1876; application filed August 12, 1876.

*To all whom it may concern:*

Be it known that I, JOSIAH W. FIELD, of Rockford, in the county of Winnebago and State of Illinois, have invented a new and valuable Improvement in Wash-Boilers; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my wash-boiler, and Fig. 2 is a plan view of the same.

This invention relates to wash-boilers; and it consists in an interior casing of conoidal shape, which is detachable from the boiler, and which is constructed as hereinafter set forth.

In the annexed drawings, A indicates a metal casing, which tapers from the bottom upward, and is oblong in horizontal section, inclosing the sides of a central space, A', which is open at both the upper and the lower end. B is a horizontal flange, surrounding the top of said casing, and supported on inclined brace-rods or brackets B', both said flange and said brace-rods or brackets being rigidly attached to said casing. Said flange is also provided with a series of perforations, b, which extend around its entire circumference. Said casing may be constructed of one piece or of two pieces, and is provided with stiffening-ridges running from top to bottom at each of its ends. The bottom of said casing is slightly curved, so that the central part thereof on both sides may touch the surface on which said casing is placed, while both the ends are raised a little above the same. This allows the passage of water under said ends for the purpose hereinafter stated. The lower edge of said casing is stiffened, and its above-described contour preserved by turning it over a wire rim C, and said casing is kept in a firm and upright position by wire supporting-rods D. The ends of said supporting-rods are secured to the sides of said casing at or near the bottom thereof, while the middle part of each of said rods extends horizontally across the bottom of space A'. Casing A is entirely supported by the middle of the bottom of said casing, and by supporting-rods D, one of which is on each side of said middle portion. E E are holes or recesses in the sides and ends of said casing at the bottom thereof. They facilitate the passage of water between the space A', within casing A, and the space between the outside of said casing and the inside of the boiler.

The operation of the device is as follows: The casing A is first placed in the boiler, with the middle part of the bottom of said casing and the supporting-rods D resting upon the surface of the bottom of said boiler. The boiler is then half-filled with water, which also runs into space A' through openings E E, and under the ends of the bottom of casing A. The clothes are then put into the space between the outside of said casing and the inside of said boiler. When the action of the heat below causes the water and steam which are with the clothes in the outer space to boil up, the said water and steam will strike against horizontal top flange B, and will be thrown or forced down into the clothes again. From the outside of casing A the water passes into the space A' through openings E E, and under the ends of the bottom of said casing. As it boils up through said space the shape of said casing brings the water and steam away from the sides of the boiler and toward the center of the same, so that when the water boils over said casing it simply falls upon and through perforated flange B, passing in among the clothes again.

The peculiarly-constructed casing A and flange B, in connection with the boiler in which they are placed, produce an effectual cleansing of the clothes, rendering unnecessary any subsequent rubbing by hand or by machine, and entirely prevent any boiling over upon the stove and surrounding objects.

What I claim as new, and desire to secure by Letters Patent, is—

1. Casing A, having a conoidal or upwardly-tapering shape, and provided with a perforated upper flange, B, substantially as and for the purpose set forth.

2. A conoidal casing for the inside of a wash-boiler, said casing having a horizontal flange around its upper rim, substantially as set forth.

3. Casing A, having its bottom rim curved, so that the two ends of said rim are raised above the surface on which said rim rests, substantially as and for the purpose set forth.

4. The combination of supporting-rods D D with casing A, constructed with a bottom rim having upwardly-turned ends, substantially as and for the purpose set forth.

5. Casing A, provided with perforations E E near the bottom of the same, and with top flange B, substantially as and for the purpose set forth.

In testimony that I claim the above I have hereunto subscribed my name in the presence of two witnesses.

JOSIAH W. FIELD.

Witnesses:
 ELIJAH W. BLAISDELL, Jr.,
 GRANVILLE HERRING.